United States Patent
Shaffer et al.

(10) Patent No.: US 8,280,961 B2
(45) Date of Patent: Oct. 2, 2012

(54) METHOD AND SYSTEM FOR PROVIDING A CAMP-ON SERVICE FOR A NETWORK SERVICE

(75) Inventors: Shmuel Shaffer, Palo Alto, CA (US);
Labhesh Patel, San Francisco, CA (US);
Denise G. Caballero-Mccann, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 980 days.

(21) Appl. No.: 11/352,074

(22) Filed: Feb. 9, 2006

(65) Prior Publication Data
US 2007/0201657 A1 Aug. 30, 2007

(51) Int. Cl.
*G06F 15/16* (2006.01)
(52) U.S. Cl. .......................... 709/206; 709/227; 709/229
(58) Field of Classification Search ................. 709/249, 709/246, 240, 238, 229, 227, 245, 228, 223, 709/207, 206, 204, 201, 224, 217, 203; 379/88.12, 379/215.01, 210.01, 204.01, 202.01, 201.01, 379/198, 167.01, 406.01, 266.04, 265.11, 379/265.09, 265.02, 265.01, 207.02; 370/466, 370/395.2, 392, 353, 352, 338, 238; 719/314, 719/313
See application file for complete search history.

(56) References Cited

U.S. PATENT DOCUMENTS

| | | | |
|---|---|---|---|
| 5,577,111 A | 11/1996 | Iida et al. ................. 379/209.01 |
| 5,812,551 A | 9/1998 | Tsukazoe et al. ............. 370/399 |
| 6,160,881 A * | 12/2000 | Beyda et al. ............. 379/209.01 |
| 6,411,601 B1 * | 6/2002 | Shaffer et al. .................. 370/230 |
| 6,418,138 B1 * | 7/2002 | Cerf et al. ...................... 370/352 |
| 6,501,750 B1 * | 12/2002 | Shaffer et al. .................. 370/352 |
| 6,601,099 B1 | 7/2003 | Corneliussen ................ 709/224 |
| 6,614,899 B1 | 9/2003 | Sollee et al. ............. 379/218.01 |
| 6,615,236 B2 | 9/2003 | Donovan et al. .............. 709/203 |
| 6,625,141 B1 | 9/2003 | Glitho et al. ................... 370/352 |
| 6,636,594 B1 | 10/2003 | Oran ......................... 379/201.01 |
| 6,658,095 B1 | 12/2003 | Yoakum et al. ............. 379/93.01 |
| 6,661,799 B1 | 12/2003 | Molitor ......................... 370/401 |
| 6,665,723 B2 | 12/2003 | Trossen ........................ 709/227 |
| 6,678,735 B1 | 1/2004 | Orton et al. ................... 709/230 |
| 6,684,147 B2 | 1/2004 | Park et al. ........................ 701/71 |
| 6,731,625 B1 | 5/2004 | Eastep et al. .................. 370/352 |
| 6,738,390 B1 | 5/2004 | Xu et al. ....................... 370/467 |
| 6,754,181 B1 | 6/2004 | Elliott et al. .................. 370/252 |
| 6,785,246 B2 | 8/2004 | Foti ............................... 370/261 |
| 6,788,676 B2 | 9/2004 | Partanen et al. .............. 370/352 |
| 6,970,547 B2 | 11/2005 | Andrews et al. ......... 379/210.01 |

(Continued)

OTHER PUBLICATIONS

U.S. Appl. No. 11/101,704, filed Apr. 8, 2005, entitled Method and System for Providing a Camp-On Service ,32 pages specification, claims and abstract, 2 pages of drawings, inventors Shmuel (nmi) Shaffer et al, Apr. 8, 2005.

(Continued)

*Primary Examiner* — David Lazaro
*Assistant Examiner* — Charles Murphy
(74) *Attorney, Agent, or Firm* — Baker Botts L.L.P.

(57) ABSTRACT

A method for providing a camp-on service for a network service includes detecting a request from a user for access to a network service and detecting that the network service is unavailable. The method includes subscribing the user to a camp-on service for the network service. The method includes detecting that the network service is available and notifying the user that the network service is available.

37 Claims, 2 Drawing Sheets

U.S. PATENT DOCUMENTS

| | | | | |
|---|---|---|---|---|
| 7,170,991 | B2* | 1/2007 | Shaffer et al. | 379/265.02 |
| 7,464,163 | B1* | 12/2008 | Bantz et al. | 709/226 |
| 2004/0054714 | A1* | 3/2004 | Wuerfel et al. | 709/203 |
| 2004/0228279 | A1* | 11/2004 | Midtun et al. | 370/236 |
| 2006/0002538 | A1* | 1/2006 | Dezonno | 379/210.01 |
| 2006/0093116 | A1* | 5/2006 | Baird | 379/209.01 |
| 2006/0245431 | A1* | 11/2006 | Morris | 370/395.4 |
| 2006/0259661 | A1* | 11/2006 | Feng et al. | 710/39 |
| 2008/0034369 | A1* | 2/2008 | Polizzi et al. | 718/102 |

OTHER PUBLICATIONS

U.S. Appl. No. 10/993,681, filed Nov. 19, 2004, entitled *System and Method for Providing A Camp-On Feature in a Session Initiation Protocol (SIP) Environment*, 37 pages specification, claims and abstract, 6 pages of drawings, inventors Denise G. Caballero-McCann et al, Nov. 19, 2004.

Cottrell et al., SLAC, Network Monitoring Tools, , http://www.slac.stanford.edu/xorg/nmtf/nmtf-tools.html, 2 pages, Last Updated Dec. 20, 2005.

Breakout Technologies Inc., Breakout Software, "Monitor IT Product Overview," http://www.breakoutsoft.com/Productl.htm, 3 pages, 2004.

Netlq, Appmanager Reporting, http://www.netiq.com/products/am/modules/reporting.asp, 2 pages, Printed Jan. 17, 2006.

Netlq, Appmanager Analysis Center, http://www.netiq.com/products/am/modules/analysiscenter.asp, 2 pages, Printed Jan. 17, 2006.

amiup.biz, Website Monitoring Service, Home, http://www.amiup.biz, 1 page, Printed Jan. 17, 2006.

amiup.biz, Website Monitoring Service, Features, http://www.amiup.biz/_features.asp, 3 pages, Printed Jan. 17, 2006.

* cited by examiner

METHOD AND SYSTEM FOR PROVIDING A CAMP-ON SERVICE FOR A NETWORK SERVICE

TECHNICAL FIELD OF THE INVENTION

This invention relates in general to network functionality and, more particularly, to a method and system for providing a camp-on service for a network service.

BACKGROUND OF THE INVENTION

As the depth and breadth of information and services available through the internet increases so does society's reliance on it. This increased reliance on the information and services available through the internet places a greater demand on the providers of these resources to always be available to everyone. In reality this is not always possible, equipment fails or needs to be upgraded, software becomes obsolete or viruses can strike. For whatever reason, there are times when a user is unable to access the particular network service they are interested in. Unfortunately, the user usually has no way of knowing how long the network service is going to be down and no way of being notified when it is up again.

Network server monitoring systems provide network administrators with information concerning the status of network servers. The monitoring systems are usually configured to provide reports detailing various statistics regarding a variety of different features of the network server. Some monitoring systems can be configured to notify a network administrator when the system goes down. Some monitoring systems, for example Cisco Clear Case, can be configured to send out predetermined notifications to a predetermined list notifying everyone on the list when the server is back on-line. The notification list and method has to be determined ahead of time and programmed into the monitoring system. Thus, all users on the list are notified whether or not they are presently interested in the availability of the network server.

Instant Messaging (IM) systems provide users attempting to initiate IM sessions with the ability to be notified when someone they want to communicate with becomes available for an IM chat.

Camp-on services are a common feature in most Private Branch Exchanges (PBXs). This feature allows a caller who calls an individual whose line is busy, to have her phone connected to the called party when the called party completes his call. When the called party hangs up, the system automatically connects the caller to the called party.

SUMMARY OF THE INVENTION

The present invention provides a method and system for providing a camp-on service for a network service that substantially eliminates or reduces disadvantages and problems associated with previous systems and methods.

In accordance with a particular embodiment of the present invention, a method for providing a camp-on service for a network service includes detecting a request from a user for access to a network service and detecting that the network service is unavailable. The method includes subscribing the user to a camp-on service for the network service. The method includes detecting that the network service is available and notifying the user that the network service is available.

Where the method includes detecting that the network service is unavailable the method may include monitoring the network service to detect the network service unavailability. Furthermore, where the method includes detecting a request from a user for access to a network service the method may include intercepting the request. The method may also include notifying the user that the network service is unavailable.

Where the method includes subscribing the user to a camp-on service the method may also include receiving a request from the user to be subscribed to the camp-on service, or it may include receiving a request from the user for access to a network service after detecting that the network service is unavailable.

Where the method includes detecting that the network service is unavailable the method may also include detecting that the request from the user for access to a network service was not granted. Furthermore, where the method includes subscribing the user to a camp-on service the method may also include automatically subscribing the user to the camp-on service after detecting that the request from the user for access to a network service was not granted.

The method may also include determining a location of the user using presence information. Furthermore, where the method includes notifying the user that the network service is available the method may include notifying the user based on the presence information.

Where the method includes notifying the user that the network service is available the method may include notifying the user that the network service is available via phone notification, e-mail notification, short message service (SMS) notification, or instant messaging (IM) notification.

In accordance with another embodiment of the present invention, a system for providing a camp-on service for a network service includes an interface operable to detect a request from a user for access to a network service. The system includes a processor coupled to the interface and operable to detect that the network service is unavailable. The system includes a processor operable to subscribe the user to a camp-on service for the network service. The system includes a processor operable to detect that the network service is available and to notify the user that the network service is available.

Technical advantages of particular embodiments include methods and systems that enable a user who has unsuccessfully attempted to access a website to begin other tasks. She is able do this because the camp-on system may notify her when the website becomes available. Accordingly, some of the embodiments of the present invention provide users with a more efficient way of accessing websites by allowing them to perform other tasks while they are waiting for a website to become available instead of having to repeatedly check the availability of the website manually.

Another technical advantage of particular embodiments is that the camp-on service automates the process of notifying users that have subscribed to a camp-on service that the network service is available. Accordingly, system managers may be more efficient by focusing their efforts on fixing the system instead of having to also worry about notifying people that the service is down and when it is up again.

Another technical advantage of particular embodiments is that the camping user may be notified on a device different from the device they originally sent the request for access to the network service. Accordingly, the user is given greater flexibility in how she spends her time while she is waiting for the network service to become available.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
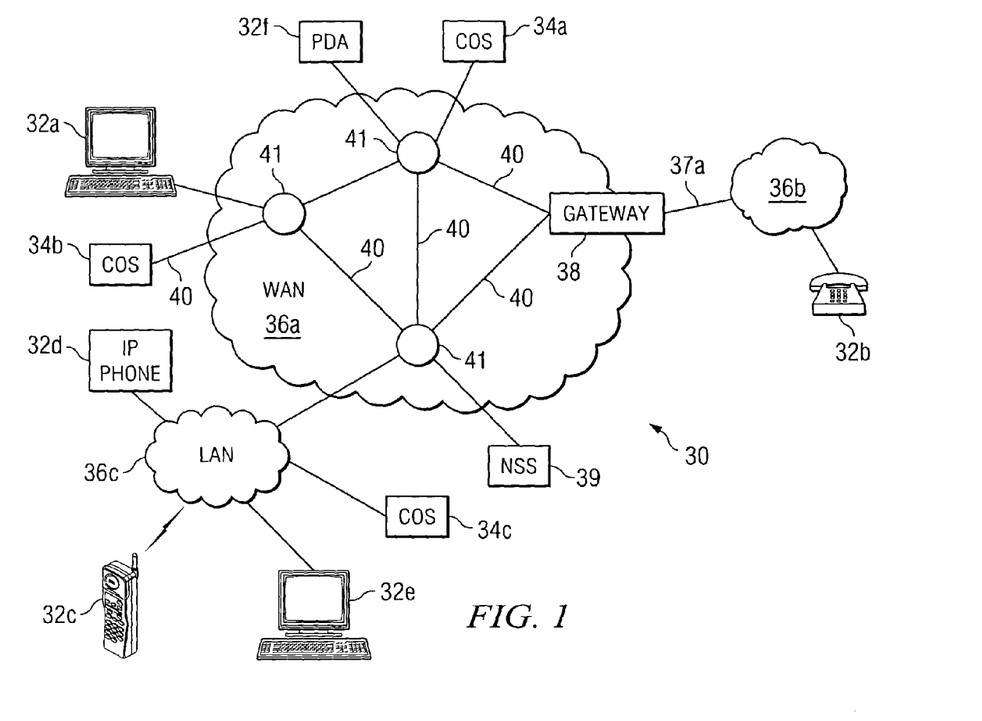
FIG. 1 illustrates a communication system including a plurality of endpoints operable to communicate among each other, a network service server, and a plurality of camp-on servers, in accordance with a particular embodiment of the present invention.

FIG. 1 illustrates a communication system 30 including a plurality of endpoints 32a-32f having the ability to communicate with each other, camp-on servers 34a-34c and/or network service server (NSS) 39. At least some of endpoints 32a-32f have the ability to access a network service that is run on NSS 39 using one or more of communication networks 36a-36c. Camp-on servers 34a-34c provide numerous different services that may work together to provide users with the ability to camp-on the availability of a currently unavailable network service hosted by NSS 39. A network service may include a website accessed through the internet, a database accessed through a company's local network or any other program, feature, webpage, database or service that may be accessed via a network.

In particular embodiments, camp-on servers 34a-34c automatically subscribe a user to a camp-on service whenever a user requests access to a network service that is presently unavailable. By monitoring the availability of network services on NSS 39, camp-on servers 34a-34c may determine when to subscribe users who request access to the network service and when to send notifications to users that the network service is available. Similarly, in some embodiments when a user is unable to access a network service she is able to elect whether or not she wants to be subscribed to a camp-on service. In some embodiments the camp-on service is not hosted by a camp-on server but on the user's endpoint, for example on personal computer endpoint 32a.

Communication network 36a includes a plurality of segments 40 and nodes 41 that couple endpoints 32a and 32f with camp-on servers 34a and 34b, gateway 38, NSS 39 and communication networks 36b-36c. Therefore, a user of endpoint 32a is provided with access to NSS 39, endpoints 32b-32f, and camp-on servers 34a-34c. Nodes 41 may include any combination of network components, gatekeepers, call managers, conference bridges, routers, hubs, switches, gateways, endpoints, or other hardware, software, or embedded logic implementing any number of communication protocols that allow for the exchange of packets in communication system 30.

Endpoints 32a-32f may be any combination of hardware, software and/or encoded logic that provide communication services to a user. For example, endpoints 32a-32f may include a telephone, a mobile phone, a computer running telephony software, a video monitor, a camera or any other communication hardware, software and/or encoded logic that supports the communication of media using communication networks 36a-36c. In the illustrated embodiment endpoints 32a and 32f, coupled to communication network 36a, include a personal computer and a personal data assistant ("PDA"), respectively. Endpoint 32b is a telephone that is coupled to communication network 36b. Endpoints 32c-32e are coupled to network 36c and include a cell phone, IP phone and personal computer, respectively. Endpoints 32a-32f may also include unattended or automated systems, gateways, other intermediate components or other devices that may establish media sessions. Although FIG. 1 illustrates six endpoints 32a-32f, communication system 30 contemplates any number and arrangement of endpoints 32a-32f for communicating media and accessing NSS 39.

Any given communication session between two of endpoints 32a-32f, camp-on servers 34a-34c and NSS 39 may include the transfer of packets across one or more communication paths that couple endpoints 32a-32f, camp-on servers 34a-34c and/or NSS 39 across communication networks 36a-36c. Such paths may include any combination of network components, gatekeepers, call managers, routers, hubs, switches, gateways, endpoints or other hardware, software or embedded logic implementing any number of communication protocols that allow for the exchange of packets in communication system 30.

In the illustrated embodiment, communication network 36a is a wide area network (WAN), communication network 36b is a public switched telephone network (PSTN), and communication network 36c is a local area network (LAN). Network 36a may be directly coupled to other IP networks, such as, but not limited to, LAN network 36c and the Internet. Since IP networks share a common method of transmitting data, telecommunication signals may be transmitted between telephony devices located on different, but interconnected, IP networks. In addition to being coupled to other IP networks, network 36a may also be coupled to non-IP telecommunication networks through the use of appropriate hardware, such as gateway 38. For example, WAN network 36a is coupled to Public Switched Telephone Network (PSTN) 36b. PSTN network 36b includes switching stations, central offices, mobile telephone switching offices, pager switching offices, remote terminals and other related telecommunications equipment that are located across the country. WAN network 36a is also coupled to LAN network 36c. Similar to WAN network 36a, LAN network 36c includes any combination of network components, gatekeepers, call managers, routers, hubs, switches, gateways, endpoints or other hardware, software or embedded logic implementing any number of communication protocols that allow for the exchange of packets.

Gateway 38 may accomplish several functions, such as converting analog or digital circuit-switched data transmitted by PSTN 36b to packetized data transmitted by network 36a and vice-versa.

Although the illustrated embodiment includes three communication networks 36a-36c, the term "communication network" should be interpreted as generally referring to any network capable of transmitting audio and/or video telecommunication signals, data, and/or messages, including signals, data or messages transmitted through text chat, instant messaging and e-mail. Any one of networks 36a-36c may be implemented as a local area network (LAN), wide area network (WAN), global distributed network such as the Internet, Intranet, Extranet, PSTN, or any other form of wireless or wireline communication network. Generally, networks 36a-36c provides for the communication of packets, cells, frames, or other portions of information (generally referred to as packets herein) between endpoints 32a-32f. Communication network 36a may include any number and combination of segments 40, nodes 41, NSSs 39, endpoints 32a-32f, and/or Camp-on servers 34a-34c.

In a particular embodiment, communication network 36a employs communication protocols that allow for the addressing or identification of endpoints, NSSs, nodes, and/or camp-on servers coupled to communication network 36a. For example, using Internet Protocol (IP), each of the components coupled together by communication network 36a in communication system 30 may be identified using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

In particular embodiments, communication system 30 may receive and transmit data in a session initiation protocol (SIP) environment. SIP is an application-layer control protocol that includes primitives for establishing, modifying and terminating communication sessions. SIP works independently of underlying transport protocols and without dependency on the type of session that is being established. SIP also transparently supports name mapping and redirection services, which support personal mobility.

It will be recognized by those of ordinary skill in the art that NSS 39, endpoints 32a-32f, camp-on servers 34a-34c and/or gateway 38 may be any combination of hardware, software, and/or encoded logic that provides communication services to a user. For example, endpoints 32a-32f may include a telephone, a personal computer (PC), a video monitor, an IP phone, a cell phone, a personal digital assistant (PDA) or any other communication hardware, software and/or encoded logic that supports the communication of packets of media (or frames) using communication networks 36a-36c. Although FIG. 1 illustrates a particular number and configuration of endpoints, camp-on servers, NSSs, segments, nodes, and gateways, communication system 30 contemplates any number or arrangement of such components for IM communications.

Figure 2:
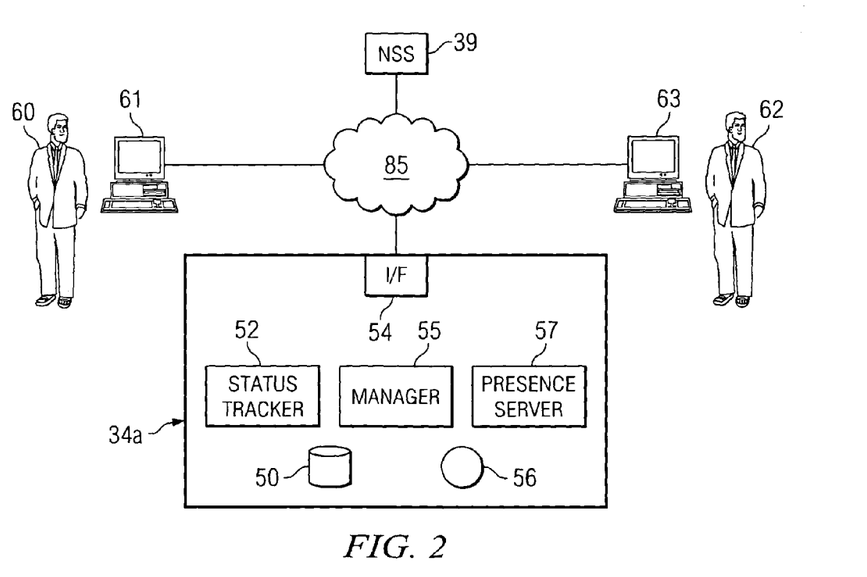
FIG. 2 illustrates the operation of a camp-on server of FIG. 1 in more detail, illustrating aspects of the present invention.

FIG. 2 illustrates the operation of camp-on server 34a in more detail, in accordance with a particular embodiment of the present invention. In the illustrated embodiment, camp-on server 34a includes memory module 50, interface 54, manager 55, processor 56, status tracker 52 and presence server 57. Interface 54 connects camp-on server 34a to communication network 85. Communication network 85 may comprise any type of communication network including one or more of the communication networks discussed above with respect to FIG. 1.

Processor 56 may be a microprocessor, controller, or any other suitable computing device, resource, or combination of hardware, software and/or encoded logic. Processor 56 may work in conjunction with other components of camp-on server 34a, such as manager 55, to provide the functionality of camp-on server 34a discussed herein. The functionality discussed herein may also be provided through an endpoint, such as endpoint 61, that is coupled to NSS 39 via network 85.

Memory module 50 may be any form of volatile or non-volatile memory including, without limitation, magnetic media, optical media, random access memory (RAM), read-only memory (ROM), removable media, or any other suitable local or remote memory component. Memory module 50 may store any suitable information necessary to accomplish the camp-on server functionality described herein, such as alternate notification methods for particular users and operational instructions associated with users.

Manager 55 provides network service camp-on functionality to users of camp-on server 34a as discussed herein. Manager 55 may be used to maintain information on users of a communication system, for example communication system 30 depicted in FIG. 1. In particular embodiments manager 55 may be integrated within camp-on server 34a and may retrieve and/or maintain a listing, table, or other organization of information about users and/or NSS 39 and its availability. The information maintained by manager 55 may include a name or other identifier for a user and contact information such as IM addresses, SMS addresses, phone numbers and/or e-mail addresses for the user. Manager 55 may also maintain information regarding the services provided by the various NSSs, their network address and the specific methods for accessing them. Manager 55 may comprise any suitable processor, computing device, resource or combination of hardware, software or encoded logic and may provide its functionality through processor 56. Some embodiments may utilize a manager that is remotely coupled to a camp-on server through one or more communication networks.

Status tracker 52 monitors or otherwise keeps track of the current availability of any network services for which a user has subscribed to a camp-on service. Status tracker 52 may be any combination of hardware, software and/or encoded logic. In some cases, status tracker 52 may work with manager 55, presence server 57 or any other components that may be useful to keep track of current communication sessions of different users.

A presence server may be used to detect and monitor the presence of users communicating within a communication system, such as communication system 30 depicted in FIG. 1. In particular embodiments presence server 57 may be integrated within camp-on server 34a and may detect presence information about users 60 and 62. This information may be used to route notifications to a camping user based on their location as detected by presence server 57. Presence server 57 may also be configured to detect when a particular network service is available or unavailable. Some embodiments may include a presence server remotely connected to a camp-on server via a network, such as an IP network. Presence server 57 may provide its functionality through processor 56 and memory 50 of camp-on server 34a. Additionally, presence server 57 may include a single computer or a group of computers that are capable of detecting the presence and current communication session of a user at an endpoint associated with the user. Examples of presence servers include presence servers as defined by IETF specifications.

While FIG. 2 depicts computer endpoints 61 and 63 and NSS 39, camp-on server 34a may be used with any appropriate number of suitable endpoints or servers, such as those described above with respect to FIG. 1. In the illustrated embodiment, endpoints 61 and 63, NSS 39 and camp-on server 34a are coupled to each other through communication network 85, which may comprise one or more communication networks such as the communication networks described above with respect to FIG. 1. It should be noted that while FIG. 2 depicts camp-on server 34a as a separate entity, much of the functionality described herein may be performed by an endpoint, such as endpoint 61 or through other components such as NSS 39.

For purposes of illustration, assume that user 60 has utilized endpoint 61 to attempt to access a network service hosted by NSS 39 but that the network service is presently unavailable. The requested network service may be unavailable because, for example: (1) the server hosting the network service, i.e. NSS 39, is unavailable, (2) the network service itself is unavailable, for example where the software that provides the network service is being updated or has been attacked by a virus, or (3) the network path between endpoint 61 and NSS 39 is down. Depending on the particular problem and in which component it lies, user 60 may be notified of the problem in a variety of ways. In some embodiments, user 60 will get an error message sent from the network service and in some embodiments an error message will be sent from camp-on server 34a. For example, user 60 may receive a "404 Not Found" (the browser could not find the requested network service on the network service server) error message.

Camp-on server 34a detects the request from user 60 to access the network service. Camp-on server 34a may detect user 60's request to access a network service hosted by NSS 39 in any of a number of ways. In some embodiments, camp-on server 34a is functionally located between user 60 and NSS 39, and all requests to access a network service hosted by NSS 39 may thus pass through camp-on server 34a. In some embodiments a snooping proxy may be used to detect user 60's request for access to the network service. The snooping proxy exists in the network and detects and logs all the failed attempts to access the network service or NSS 39. In some embodiments the snooping proxy functionality is distributed in the network as part of the Cisco Applications Oriented Network (AON) architecture. In some embodiments camp-on server 34a is expressly told that user 60 has attempted to access a network service hosted by NSS 39. This may be done, for example, by user 60, by his endpoint 61, or by a 'third-party' entity, such as user 62 or his endpoint 63.

In some embodiments the endpoint, for example endpoint 61, is programmed to notify the camp-on server that the endpoint has received an error message, for example a "404 Not Found" error message. Camp-on server 34a, in particular embodiments, may be able detect if the network service is running properly and/or if NSS 39 is running properly. If the camp-on server 34a is connected to NSS 39 then camp-on server 34a may detect the availability of either the network service or NSS 39 in a variety of ways. In some embodiments camp-on server 34a uses interface 54 to intercept and interpret communications sent from NSS 39. If the communications contain error messages then camp-on server 34a may determine that the network service is unavailable. Camp-on server 34a may also interpret the intercepted messages to determine if the messages contain proper responses to a user's request. It should be noted that if the network service is using secure HTTP then camp-on server 34a may need a sharing key to be able to interpret the response to determine if it was proper and/or if it was an error message. In some embodiments camp-on server 34a may simply eavesdrop to determine whether a response was sent in response to a user's request.

In particular embodiments camp-on server 34a may detect that the network service is available by periodically checking the status of both the network service and NSS 39. The periodic checks may be done, for example, by registering NSS 39 with a presence server, for example presence server 57. When NSS 39 is registered with presence server 57, presence server 57 periodically renews its registration. Thus, if NSS 39 becomes unavailable it will fail to renew its registration with presence server 57 thereby signifying that NSS 39 is unavailable.

In some embodiments the camp-on server may periodically check the availability of NSS 39 by monitoring NSS 39. Camp-on server 34a may monitor NSS 39 by pinging it at the network layer or application layer. Camp-on server 34a may also use SIP, right-to-respond (RTR) or internet message control protocol (IMCP) options to monitor the availability of NSS 39.

In some embodiments, when user 60 receives an error message stating that the requested network service is presently unavailable, user 60 may attempt to contact user 62 to ascertain the status of the requested network service. In this embodiment user 62 is someone associated with the network service, for example a member of the technical support staff of a company hosting the requested network service. When user 62 receives user 60's inquiry, user 62 may notify camp-on server 34a that a particular network service is unavailable thereby causing camp-on server 34a to initiate a camp-on service. User 62 may also subscribe user 60 to the camp-on service associated with the requested network service about which user 60 called. In some embodiments, camp-on server 34a may be integrated with the communication system used by user 62 so that as soon as user 60 attempts to contact user 62 the camp-on server automatically either subscribes user 60 to a camp-on service for the network service or asks user 60 if he would like to be subscribed to a camp-on service.

Waiting for user 60 to call user 62 is not the only way to subscribe user 60 to a camp-on service. In some embodiments when user 60 attempts to access a network service that camp-on server 34a has detected as being unavailable, camp-on server 34a will intercept the request to access the presently unavailable network service and will send its own message to user 60. In some embodiments this message may inform user 60 that he has automatically been subscribed to a camp-on service and will be notified when the network service becomes available. In some embodiments the message sent by camp-on server 34a will include a prompt that will allow user 60 to elect to be subscribed to a camp-on service by, for example, pressing a soft-key. The message may also include a prompt for user 60's preferred method and/or location for being notified when the network service becomes available. In some embodiments camp-on server 34a maintains a log of failed attempts to access a network service. All the users who are listed in the log of failed attempts to access a network service are automatically subscribed to a camp-on service.

In particular embodiments, for example where the functionality of camp-on server 34a is included at endpoint 61, endpoint 61 may detect an error message being sent from the presently unavailable network service and will then automatically subscribe the user to a camp-on service. In some embodiments endpoint 61 will not automatically subscribe user 60 to a camp-on service. Rather it will display an error message, and user 60 will have to take an affirmative step to invoke a camp-on service. For example, user 60 may use an internet browser program that has a button integrated into the toolbar of the browser (or a menu option to invoke the camp-on service. Endpoint 61 may, in some embodiments, intercept the error message and replace it with its own message containing a prompt for user 60 to invoke a camp-on service and/or a prompt for user 60's preferred method and/or location for being notified when the network service becomes available.

Camp-on server 34a may continue to subscribe users to a camp-on service until the network service for which the users were camping-on becomes available. Camp-on server 34a may be notified that the network service is available through any of the methods discussed above with respect to being notified that the network service was unavailable, such as monitoring NSS 39 or intercepting and interpreting messages sent from NSS 39. After the network service becomes available camp-on server 34a notifies the users that have subscribed to the camp-on service that the network service is available so that the users may obtain the service they initially requested. Where and how the users are notified may depend on information they entered, information that camp-on server 34a collected, or information communicated to camp-on server 34a through some other means.

In some embodiments camp-on server 34a may prompt user 60 to enter his desired contact method, device and/or location. The available types of notifications that may be sent and the amount of information needed to be gathered from user 60 will depend on the environment in which the camp-on service is being run. For example, if camp-on server 34a is being used by a business to provide camp-on services for an in-house network service camp-on server 34a may store within memory 50 contact information for several different points of contact for employees of the business. Thus, when user 60 encounters an unavailable network service, camp-on server 34a may provide a list of devices for which camp-on server 34a has information. User 60 may then select the preferred device for his notification. Alternatively, camp-on server 34a may not ask user 60 to select the preferred device, but rather the preferred device may have been predetermined when the information was initially entered. In some embodiments the notification may be sent based on information obtained from presence server 57. For example, if user 60 is presently logged into endpoint 61, the notification will be sent to endpoint 61, but if user 60 is not logged into any endpoint that presence server 57 is monitoring then camp-on server 34a may notify user 60 at a preferred alternate contact point, such as user 60's cell phone.

A similar scenario arises when the camp-on service is being run on endpoint 61. In this scenario endpoint 61 may store contact information for one or more devices associated with various users that use endpoint 61. For example, if user 60 is the only person that uses endpoint 61, then endpoint 61 could store user 60's e-mail address, cell phone number and home phone number. In some embodiments endpoint 61 may not need to store any contact information. Rather, endpoint 61 may itself notify user 60 that the network service is available. For example, if user 60 used a web browser to attempt to access a network service, when the network service becomes available the web browser may open a new window running the now available network service.

A different scenario may arise if camp-on server 34a is provisioned to provide a camp-on service for the public, as opposed to only for employees of a company. If, for example, the camp-on service is being provided for a network service accessible through the internet it may be impractical to have permanently stored within memory 50 the contact information for every user of the internet. Thus, it may be advantageous to collect this information from users as they subscribe to a camp-on service. In some embodiments this information is automatically ascertained. For example, the camp-on server 34a may capture the IP address of each user that attempts to access the network service, and this address may be used to send the notification that the service is available. In some embodiments camp-on server 34a may prompt user 60 to enter his contact information. In some embodiments user 62 may collect the information from user 60 and enter the collected information into camp-on server 34a. Thus, camp-on server 34a only stores the contact information for users who have subscribed to a camp-on service.

It should be noted that the type of notification sent to a user that a requested network service is now available is not intended to be limited in any way by the various examples discussed herein. User 60 may, at the least, be notified by any of the following: (i) a voice call sent to his cell phone or telephone, (ii) a text message sent via instant messaging, e-mail or SMS, (iii) a pop-up window on his computer or PDA, (iv) a page sent to a pager or cell phone, or (v) any other manner through any suitable type of device capable of notifying user 60.

It will be recognized by those of ordinary skill in the art that camp-on server 34a is merely one example configuration of a camp-on server for using a network service camp-on service in accordance with particular embodiments. Camp-on server 34a may include any number of presence servers, interfaces, processors, memory modules and status trackers to accomplish the functionality and features described herein. For example, although camp-on server 34a is illustrated and described as including memory module 50, status tracker 52, interface 54, manager 55, processor 56, and presence server 57 these components and other desired components for performing the above described functionality may be centrally located (local) with respect to one another, or distributed throughout communication system 30. In addition, one or more components of camp-on server 34a may work together in performing various functionality described herein. Moreover, camp-on server 34a may work with other network components, such as a call manager to perform the various functionality described herein.

Figure 3:
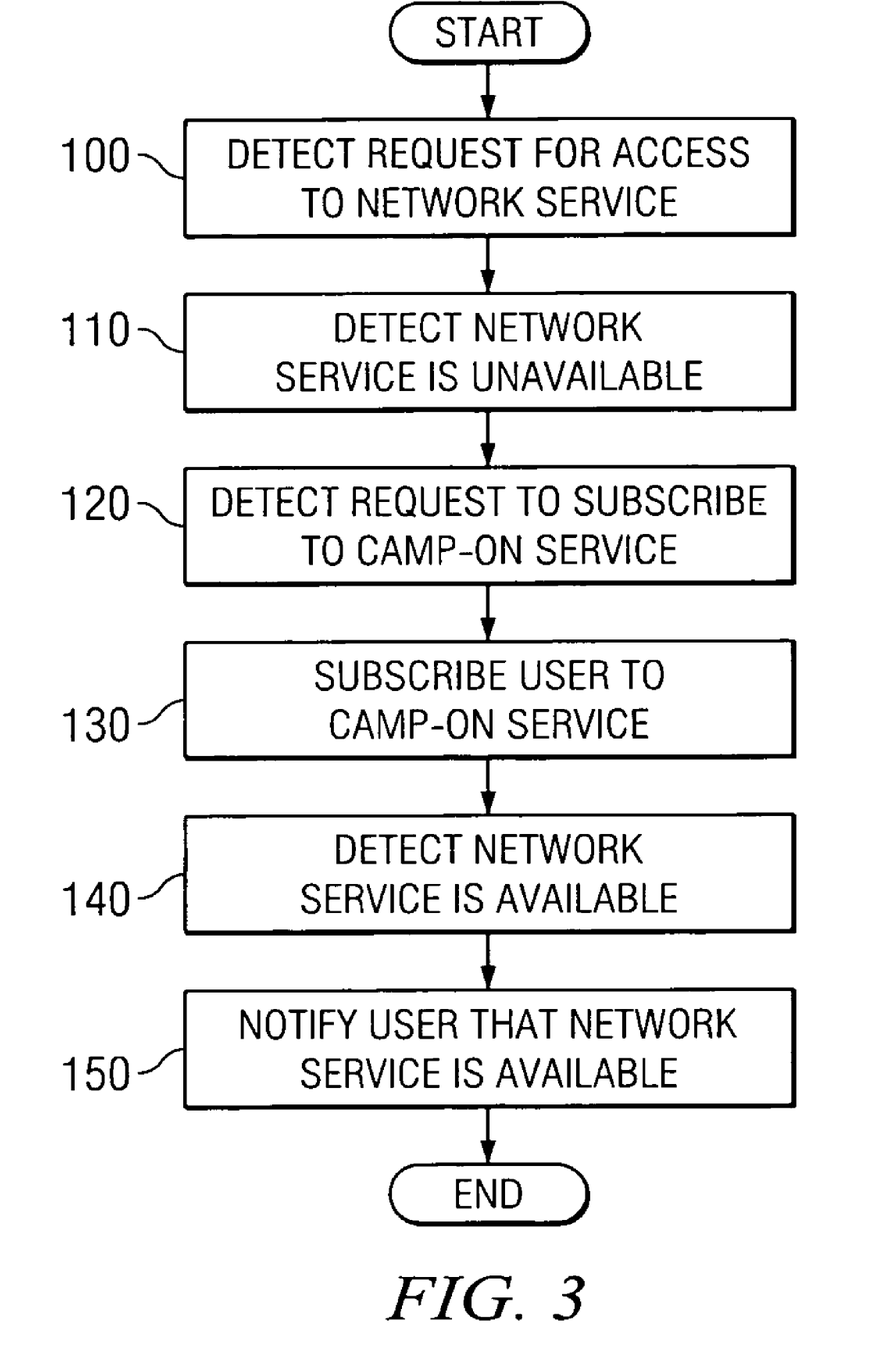
FIG. 3 illustrates a method for providing a camp-on service for a network service, in accordance with an embodiment of the present invention.

FIG. 3 is a flowchart illustrating a method for providing a camp-on service for a network service in accordance with a particular embodiment. The method begins at step 100 where a request for access to a network service is detected. The network service may include a website accessed through the internet, a database accessed through a company's local network or any other program, feature, webpage, database or service that may be accessed via a network. The request may be sent by a user via any endpoint capable of accessing and running the requested network service. For example, the user may use his personal computer or his PDA to attempt to access the network service. The request for access to the network service may, for example, be detected by intercepting the user's request for access to the network service or by specifically receiving a request from the user.

At step 110 the unavailability of the requested network service is detected. The network service unavailability may be detected through any of a variety of different methods, such as by intercepting an error message from a NSS, not detecting a response to the user's request to access the network service, or monitoring the availability of the NSS. In some embodiments the device that detects that the network service is unavailable may send a notification to the user that the requested network service is unavailable.

At step 120 a request to subscribe to a camp-on service for the unavailable network service is received. The request to subscribe to a camp-on service may include information relevant to how and where to contact the camping user. Some of the possible ways the request may be received include inquiring whether the user would like to subscribe to a camp-on service, receiving from the user a selection of a camp-on feature, or automatically generating the request whenever a user attempts to access an unavailable network service.

At step 130 the user is subscribed to the camp-on service. Thus, the device providing the camp-on service will monitor the availability of the requested network service and will notify the user when the requested network service becomes available. This allows the user to do other tasks instead of having to repeatedly check the availability of the network service himself.

At step 140 it is detected that the requested network service is available. The availability of a network service may be determined in a variety of ways; some of the ways include pinging the NSS, interpreting the messages sent from the NSS, or registering the NSS with a presence server. At step 150 the device notifies the user that the requested network service is presently available. The device notifies those users that have subscribed to the camp-on service. The notification may, for example, be by a voice call sent to his cell phone or telephone, a text message sent via instant messaging, e-mail or SMS, a pop-up window on his computer or PDA, a page sent to a pager or cell phone, or any other type of notification sent to any device capable of notifying the user.

Some of the steps illustrated in FIG. 3 may be combined, modified or deleted where appropriate, and additional steps may also be added to the flowchart. Additionally, the steps may be performed in any suitable order without departing from the scope of the invention.

As indicated above, technical advantages of particular embodiments include the ability to camp-on the availability of a network service that is currently unavailable. Thus, particular embodiments allow a user, who is camping-on the availability of a network service, to leave the endpoint from which he first requested access to the network service without having to worry about missing the moment when the network service becomes available.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and camp-on server 34a, these elements may be combined, rearranged or positioned in order to accommodate particular routing architectures or needs. In addition, any of these elements may be provided as separate external components to communication system 30, camp-on server 34a or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for providing a camp-on service for a network service, comprising:
   detecting, at a camp-on server, a plurality of requests from a plurality of users requesting access to a network service hosted by a network service server;
   detecting, at the camp-on server, that the network service is unavailable and that the plurality of requests will not be fulfilled;
   subscribing the user to a camp-on service for the network service at the camp-on server, wherein the user is automatically subscribed to the camp-on service by the camp-on server upon detecting that the network service is unavailable;
   detecting, at the camp-on server, that the network service is available;
   notifying each of the plurality of users from the camp-on server that the network service is available for each of the plurality of users to re-send their respective request; and
   receiving a re-sent request from at least one user of the plurality of users subscribed to the camp-on service.

2. The method of claim 1:
   wherein:
      detecting that the network service is unavailable comprises monitoring the network service to detect the network service unavailability; and
      detecting a request from a user for access to a network service comprises intercepting the request; and
   further comprising notifying the user that the network service is unavailable.

3. The method of claim 1, wherein subscribing the user to a camp-on service comprises receiving a request from the user for access to a network service after detecting that the network service is unavailable.

4. The method of claim 1, wherein:
   detecting that the network service is unavailable comprises detecting that the request from the user for access to a network service was not granted; and
   subscribing the user to a camp-on service comprises automatically subscribing the user to the camp-on service in response to detecting that the request from the user for access to a network service was not granted.

5. The method of claim 1:
   further comprising determining a location of the user using presence information; and
   wherein notifying the user that the network service is available comprises notifying the user based on the presence information.

6. The method of claim 1, wherein notifying the user that the network service is available comprises notifying the user that the network service is available via phone notification.

7. The method of claim 1, wherein notifying the user that the network service is available comprises notifying the user that the network service is available via e-mail notification.

8. The method of claim 1, wherein notifying the user that the network service is available comprises notifying the user that the network service is available via short message service (SMS) notification.

9. The method of claim 1, wherein notifying the user that the network service is available comprises notifying the user that the network service is available via instant messaging (IM) notification.

10. The method of claim 1, further comprising, upon detecting that the network service is unavailable, transmitting an error message to the endpoint of the user.

11. A method for providing a camp-on service for a network service, comprising:
   detecting, at a camp-on server, a plurality of requests from a plurality of users requesting access to a network service hosted by a network service server;
   detecting, at the camp-on server, that the network service is unavailable and that the plurality of requests will not be fulfilled;
   subscribing the user to a camp-on service for the network service at the camp-on server, wherein the user is automatically subscribed to the camp-on service by the camp-on server upon detecting that the network service is unavailable, the user is one of a plurality of users subscribed to the camp-on service to be notified from the camp-on server that the network service is available for each of the plurality of users to re-send their respective request; and
   receiving a request from the user to not be subscribed to the camp-on service.

12. A system for providing a camp-on service for a network service, comprising a camp-on server, the camp-on server comprising:
    an interface operable to detect a plurality of requests from a plurality of users requesting access to a network service hosted by a network service server; and
    a processor coupled to the interface and operable to:
        detect that the network service is unavailable and that the plurality of requests will not be fulfilled;
        subscribe the user to a camp-on service for the network service, wherein the user is automatically subscribed to the camp-on service by the processor upon detecting that the network service is unavailable; and
        detect that the network service is available; and
    wherein the interface is further operable to:
        notify each of the plurality of users that the network service is available for each of the plurality of users to re-send their respective request; and
        receive a re-sent request from at least one user of the plurality of users subscribed to the camp-on service.

13. The system of claim 12, wherein:
    the processor operable to detect that the network service is unavailable comprises a processor operable to monitor the network service to detect the network service unavailability;
    the interface operable to detect a request from a user for access to a network service comprises an interface operable to intercept the request; and
    the processor is further operable to notify the user that the network service is unavailable.

14. The system of claim 12, wherein the processor operable to subscribe the user to a camp-on service comprises a processor operable to receive a request from the user for access to a network service after detecting that the network service is unavailable.

15. The system of claim 12, wherein the processor operable to:
    detect that the network service is unavailable comprises a processor operable to detect that the request from the user for access to a network service was not granted; and
    subscribe the user to a camp-on service comprises a processor operable to automatically subscribe the user to the camp-on service in response to the processor detecting that the request from the user for access to a network service was not granted.

16. The system of claim 12:
    wherein the processor is further operable to determine a location of the user using presence information; and
    wherein the processor operable to notify the user that the network service is available comprises a processor operable to notify the user based on the presence information.

17. The system of claim 12, wherein the processor operable to notify the user that the network service is available comprises a processor operable to notify the user that the network service is available via phone notification.

18. The system of claim 12, wherein the processor operable to notify the user that the network service is available comprises a processor operable to notify the user that the network service is available via e-mail notification.

19. The system of claim 12, wherein the processor operable to notify the user that the network service is available comprises a processor operable to notify the user that the network service is available via short message service (SMS) notification.

20. The system of claim 12, wherein the processor operable to notify the user that the network service is available comprises a processor operable to notify the user that the network service is available via instant messaging (IM) notification.

21. A system for providing a camp-on service for a network service, comprising a camp-on server, the camp-on server comprising:
    an interface operable to detect a plurality of requests from a plurality of users requesting access to a network service hosted by a network service server; and
    a processor coupled to the interface and operable to:
        detect that the network service is unavailable and that the plurality of requests will not be fulfilled;
        subscribe the user to a camp-on service for the network service, wherein the user is automatically subscribed to the camp-on service by the processor upon detecting that the network service is unavailable, the user is one of a plurality of users subscribed to the camp-on service to be notified from the camp-on server that the network service is available for each of the plurality of users to re-send their respective request; and
    wherein the interface is further operable to receive a request from the user to not be subscribed to the camp-on service.

22. A non-transitory computer readable storage medium, the computer readable storage medium comprising executable code that when executed by a processor is operable to:
    detect, at a camp-on server, a plurality of requests from a plurality of users requesting access to a network service hosted by a network service server;
    detect, at the camp-on server, that the network service is unavailable and that the plurality of requests will not be fulfilled;
    subscribe the user to a camp-on service for the network service at the camp-on server, wherein the user is automatically subscribed to the camp-on service by the camp-on server upon detecting that the network service is unavailable;
    detect, at the camp-on server, that the network service is available;
    notify each of the plurality of users from the camp-on server that the network service is available for each of the plurality of users to re-send their respective request; and
    receive a re-sent request from at least one user of the plurality of users subscribed to the camp-on service.

23. The computer readable storage medium of claim 22:
    wherein:
    the code operable to detect that the network service is unavailable comprises code operable to monitor the network service to detect the network service unavailability; and
    the code operable to detect a request from a user for access to a network service comprises code operable to intercept the request; and
    further comprising code operable to notify the user that the network service is unavailable.

24. The computer readable storage medium of claim 22, wherein the code operable to subscribe the user to a camp-on service comprises code operable to receive a request from the user for access to a network service after detecting that the network service is unavailable.

25. The computer readable storage medium of claim 22, wherein the code operable to:
    detect that the network service is unavailable comprises code operable to detect that the request from the user for access to a network service was not granted; and
    subscribe the user to a camp-on service comprises code operable to automatically subscribe the user to the camp-on service in response to detecting that the request from the user for access to a network service was not granted.

26. The computer readable storage medium of claim 22:
further comprising code operable to determine a location of the user using presence information; and
wherein the code operable to notify the user that the network service is available comprises code operable to notify the user based on the presence information.

27. The computer readable storage medium of claim 22, wherein the code operable to notify the user that the network service is available comprises code operable to notify the user that the network service is available via phone notification.

28. The computer readable storage medium of claim 22, wherein the code operable to notify the user that the network service is available comprises code operable to notify the user that the network service is available via e-mail notification.

29. The computer readable storage medium of claim 22, wherein the code operable to notify the user that the network service is available comprises code operable to notify the user that the network service is available via short message service (SMS) notification.

30. The computer readable storage medium of claim 22, wherein the code operable to notify the user that the network service is available comprises code operable to notify the user that the network service is available via instant messaging (IM) notification.

31. A non-transitory computer readable storage medium, the computer readable storage medium comprising executable code that when executed by a processor is operable to:
detect, at a camp-on server, a plurality of requests from a plurality of users requesting access to a network service hosted by a network service server;
detect, at the camp-on server, that the network service is unavailable and that the plurality of requests will not be fulfilled;
subscribe the user to a camp-on service for the network service at the camp-on server, wherein the user is automatically subscribed to the camp-on service by the camp-on server upon detecting that the network service is unavailable, the user is one of a plurality of users subscribed to the camp-on service to be notified from the camp-on server that the network service is available for each of the plurality of users to re-send their respective request; and
receive a request from the user to not be subscribed to the camp-on service.

32. A system for providing a camp-on service for a network service, comprising:
means for detecting, at a camp-on server, a plurality of requests from a plurality of users requesting access to a network service hosted by a network service server;
means for detecting, at the camp-on server, that the network service is unavailable and that the plurality of requests will not be fulfilled;
means for subscribing the user to a camp-on service for the network service at the camp-on server, wherein the user is automatically subscribed to the camp-on service by the camp-on server upon detecting that the network service is unavailable;
means for detecting, at the camp-on server, that the network service is available;
means for notifying each of the plurality of users from the camp-on server that the network service is available for each of the plurality of users to re-send their respective request; and
means for receiving a re-sent request from at least one user of the plurality of users subscribed to the camp-on service.

33. A method comprising:
detecting, at a camp-on server, a plurality of requests from a plurality of users requesting access to a network service hosted by a network service server, each request from an initial device associated with a respective user;
detecting, at the camp-on server, that the network service is unavailable and that the plurality of requests will not be fulfilled;
subscribing the user to a camp-on service for the network service at the camp-on server;
detecting, at the camp-on server, that the network service is available;
notifying each of the plurality of users from the camp-on server at a secondary device different than the initial device that the network service is available for each of the plurality of users to re-send their respective request; and
receiving a re-sent request from at least one user of the plurality of users subscribed to the camp-on service.

34. The method of claim 33, further comprising determining an identification of the secondary device from a presence server aware of a presence associated with the user.

35. A method comprising:
detecting, at a camp-on server, a plurality of requests from a plurality of users requesting access to a network service hosted by a network service server, each request from an initial communication method associated with a respective user;
detecting, at the camp-on server, that the network service is unavailable and that the plurality of requests will not be fulfilled;
subscribing the user to a camp-on service for the network service at the camp-on server;
detecting, at the camp-on server, that the network service is available;
notifying each of the plurality of users from the camp-on server via a secondary communicate method different than the initial communication method that the network service is available for each of the plurality of users to re-send their respective request; and
receiving a re-sent request from at least one user of the plurality of users subscribed to the camp-on service.

36. The method of claim 35, further comprising determining a type of communication associated with the secondary communication method from a presence server aware of a presence associated with the user.

37. The method of claim 10, wherein transmitting the error message comprises transmitting an error message indicating that the user has been automatically subscribed to a camp-on service.

\* \* \* \* \*